(12) United States Patent
Blanch Pinol et al.

(10) Patent No.: US 11,755,862 B2
(45) Date of Patent: Sep. 12, 2023

(54) IMAGE RENDERING (71) Applicant: Hewlett-Packard Development Company, L.P., Spring, TX (US)

(72) Inventors: Marta Blanch Pinol, Sant Cugat del Valles (ES); Cristina Crespi Argemi, Sant Cugat del Valles (ES); Sara Echevarria Benito, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 467 days.

(21) Appl. No.: 16/978,469

(22) PCT Filed: Apr. 9, 2018

(86) PCT No.: PCT/US2018/026715
§ 371 (c)(1),
(2) Date: Sep. 4, 2020

(87) PCT Pub. No.: WO2019/199267
PCT Pub. Date: Oct. 17, 2019

(65) Prior Publication Data
US 2021/0110221 A1    Apr. 15, 2021

(51) Int. Cl.
*G06K 15/02*    (2006.01)
*B41J 2/21*    (2006.01)
(Continued)

(52) U.S. Cl.
CPC ......... *G06K 15/1823* (2013.01); *B41J 2/2114* (2013.01); *B41J 2/2121* (2013.01);
(Continued)

(58) Field of Classification Search
CPC . G06K 15/1823; G06K 15/407; B41J 2/2114; B41J 2/2121; B41J 2/2132; B41J 2/2054; B41J 2002/2058; B41J 2/01; B41J 11/0015; B41J 11/00216; B41J 25/001; B41J 25/34; B41J 25/003; B41J 2/21; B41J 25/312; B41J 2025/008; B41J 2202/21;
(Continued)

(56) References Cited

U.S. PATENT DOCUMENTS

| | | | | |
|---|---|---|---|---|
| 6,435,639 B1 * | 8/2002 | Nakajima | ............... | B41J 2/2114 347/15 |
| 6,464,330 B1 * | 10/2002 | Miller | .................... | B41J 2/2128 347/40 |

(Continued)

FOREIGN PATENT DOCUMENTS

| | | |
|---|---|---|
| CN | 103958211 | 7/2014 |
| CN | 104853924 | 8/2015 |

(Continued)

*Primary Examiner* — Manish S Shah (57) ABSTRACT

There is provided a method for rendering an image according to selected image quality attributes. Two or more image quality attributes are selected from a plurality of attributes of the image. A set of pigments for an area of the image and a density for each pixel of the area are determined. A quantity of pretreatment for deposition onto a print target is determined, where the pretreatment quantity is dependent on the pigments, the density, and the selected image quality attributes.

13 Claims, 4 Drawing Sheets

(51) Int. Cl.
*B41M 5/00* (2006.01)
*G06K 15/00* (2006.01)
*B41J 2/205* (2006.01)

(52) U.S. Cl.
CPC .......... *B41J 2/2132* (2013.01); *B41M 5/0017* (2013.01); *G06K 15/407* (2013.01); *B41J 2/2054* (2013.01); *B41J 2002/2058* (2013.01)

(58) Field of Classification Search
CPC .. B41J 2/17596; B41J 2/16508; B41J 2/1652; B41J 2/16538; B41J 2/175; B41J 2/17563; B41J 29/02; B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/161; B41J 2/19; B41J 15/04; B41J 2/1623; B41J 2202/00; B41J 2202/03; B41J 2/14201; B41J 2/045; B41J 11/002; B41J 2/04581; B41J 2/055; B41J 2002/16502; B41J 2/04588; B41J 2/04595; B41J 2/04586; B41J 2/14274; B41J 2/211; B41J 2/17; B41J 2/17593; B41J 2/2107; B41J 2/1755; B41J 2/2117; B41J 2/2056; B41J 2/0057; B41J 3/60; B41J 2002/012; B41J 2/04598; B41M 5/0017; B41M 1/34; B41M 5/0011; B41M 5/0023; B41M 5/007; B41M 7/0018; B41M 5/0047; B41M 7/00; B41M 7/0072; B41M 5/52; B41M 5/5218; B41M 5/5227; H04N 1/54; C09D 11/322; C09D 11/033; C09D 11/037; C09D 11/108; C09D 11/326; C09D 11/36; C09D 11/30; C09D 11/50; C09D 11/54; C09D 11/107; C09D 11/03; C09D 11/40; C09D 11/38; C09D 11/32; C09D 11/324; C09D 11/328; C09D 11/101; C09D 11/102; C09D 11/005; C09D 11/52; C09D 11/106; C04B 41/4539; C04B 41/5025; C04B 41/87; C09K 23/002; C09K 23/003; C09K 23/16; C09C 1/0009; C09C 3/041; C01P 2004/62

See application file for complete search history.

(56) References Cited

U.S. PATENT DOCUMENTS

| | | | |
|---|---|---|---|
| 6,598,965 B1* | 7/2003 | Lund | B41J 2/2114 347/96 |
| 7,338,143 B2 | 3/2008 | Onishi et al. | |
| 8,556,360 B2 | 10/2013 | Chung et al. | |
| 8,864,299 B2 | 10/2014 | Suzuki et al. | |
| 8,967,753 B2 | 3/2015 | Suzuki et al. | |
| 9,272,539 B2 | 3/2016 | Yasu et al. | |
| 9,421,804 B2 | 8/2016 | Muller et al. | |
| 9,487,039 B2 | 11/2016 | Casals et al. | |
| 2004/0046820 A1 | 3/2004 | Wu et al. | |
| 2013/0061767 A1* | 3/2013 | Casals | B41M 1/14 101/202 |
| 2014/0253621 A1* | 9/2014 | Sakurada | B41J 19/147 347/15 |
| 2014/0292843 A1* | 10/2014 | Fernandez del Rio | B41J 2/2132 347/21 |
| 2017/0087880 A1* | 3/2017 | Verdugo | B41J 2/2132 |

FOREIGN PATENT DOCUMENTS

| | | | |
|---|---|---|---|
| EP | 1354713 | 10/2003 | |
| EP | 2436523 | 4/2012 | |
| JP | 5328423 B2 | 10/2013 | |
| WO | WO-2006063096 | 6/2006 | |
| WO | WO-2006063096 A1 * | 6/2006 | .......... B41M 5/5236 |
| WO | 2013050080 A1 | 4/2013 | |

* cited by examiner

IMAGE RENDERING

BACKGROUND

An image can be printed on a medium where characteristics of the image can be controlled through image processing or printing variables. To enhance an image quality various printing conditions such as a printing fluid delivery amount per pixel can be controlled.

BRIEF DESCRIPTION OF THE DRAWINGS

Various features and advantages of certain examples will be apparent from the detailed description which follows, taken in conjunction with the accompanying drawings, which together illustrate, by way of example only, a number of features, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Image quality or print characteristics can be controlled using pre-processing of an image, where a treating agent can be applied to improve image quality. The treating agent can be applied as a proportion of printing fluid density per pixel or applied as a constant layer across the image.

An image resource or image content may be used to render an image on a print target. In the context of this description the term render relates to the process of printing an image, i.e. rendering an image on a substrate using rendering fluid (or printing fluids or inks) to provide a physical image on a substrate. According to an example, a pre-treatment can be applied as a proportion of an image resource to improve the quality of the rendered image. A pre-treatment may be deposited on the print target and a rendering fluid subsequently deposited on the same print target. For example, an image resource may be a density of a rendering fluid in each pixel, a number of drops of a rendering fluid per pixel, a print target type, or a pigment of a rendering fluid. According to an example, a pre-treatment can be applied as a proportion of the number of drops of rendering fluid per pixel of an image. According to another example, the pre-treatment layer may be applied as a constant layer across parts of the image or the entire image.

Different rendering fluids having different pigments may be used to render an image. For example, in the context of an inkjet printer, the pigment load in a printing fluid formulation may be very low compared to the total amount of rendering fluid. A pre-treatment or optimizer can be applied before the rendering fluid or colored printing fluids. The pre-treatment can fix the pigment at a desired location on the print target. The pre-treatment can prevent movement of the pigment whilst the rest of the rendering fluid is evaporated.

The pre-treatment amount can be varied to modify some image quality and pigment or color attributes. An attribute or parameter may relate to a visual appearance or a defect in the rendered image. Examples of an image quality attribute according to the present disclosure comprise a printing fluid bleeding defect, coalescence, gloss banding or other visual defect.

A printing fluid bleeding defect relates to a reduction in the edge definition between regions of the image due to a spreading of the printing fluid or rendering fluid beyond a location of its original placement. This may be caused by flooding of the print target or substrate onto which the image is rendered.

Coalescence relates to the movement of pigment on the print target beyond a location of its original placement which can lead to pigment particles grouping together. The visual result of coalescence is a mottled or grainier appearance of the rendered image.

Gloss banding relates to visual banding or striping across a rendered image. There are many causes of gloss banding including misaligned nozzles or print target skewing.

More control over the print characteristics may be used in cases wherein a print target that has a rough surface than in a print target with a smooth surface to maintain the same image resolution.

An adequate pre-treatment quantity can vary between different attributes to obtain a desired appearance of the rendered image. For example, an adequate quantity of pre-treatment to minimise printing fluid bleed or coalescence may depend upon the rendering fluid pigment (printing fluid color) and/or the rendering fluid density. The pigment and density may vary within the same image. A pre-treatment amount or quantity can be determined per rendering fluid pigment and/or density for achieving an adequate image quality with minimised visual defects or attributes in the rendered image. According to an example, a pre-treatment amount is determined according to a look-up-table for each rendering fluid pigment and density.

Figure 1A:
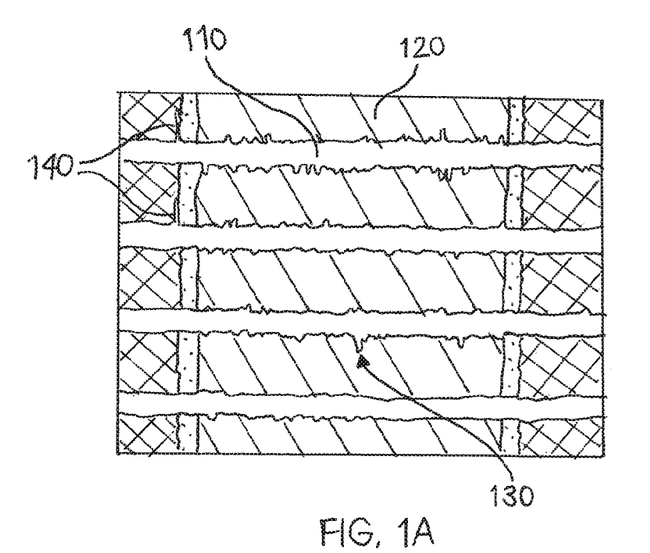
FIG. 1A is a schematic of printing fluid bleeding for a pre-treatment amount of 15% on a cellulosic board according to an example.
Figure 1B:
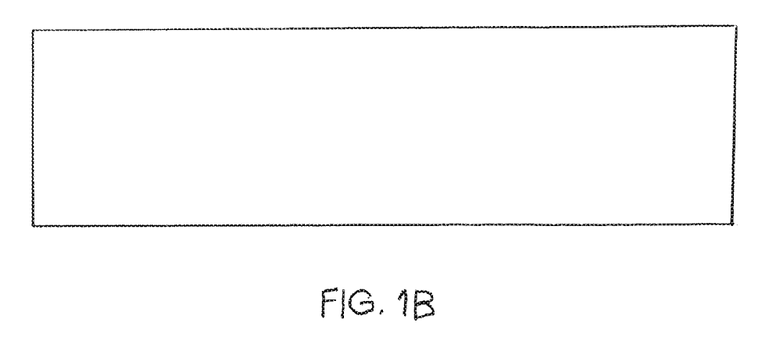
FIG. 1B is a schematic of coalescence for a pre-treatment amount of 15% on a cellulosic board according to an example.
Figure 2A:
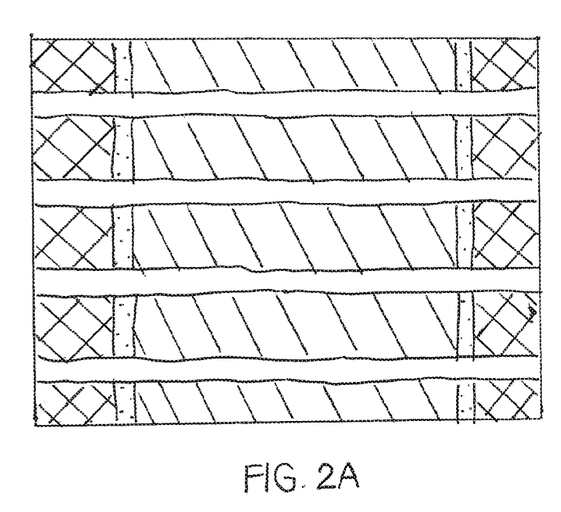
FIG. 2A is a schematic of printing fluid bleeding for a pre-treatment amount of 30% on a cellulosic board according to an example.
Figure 2B:
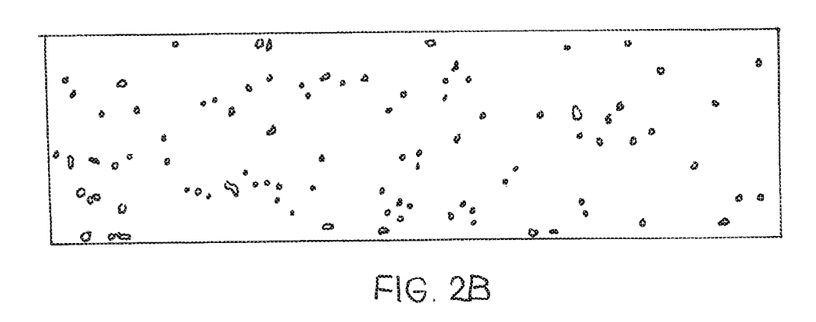
FIG. 2B is a schematic of coalescence for a pre-treatment amount of 30% on a cellulosic board according to an example.

FIGS. 1-2 show printing fluid bleeding and coalescence for different pre-treatment amounts on a cellulosic board.

FIG. 1A shows an example of a printing fluid bleeding defect for a pre-treatment amount of 15% of the rendering fluid density per pixel on a cellulosic board. It can be seen that the boundary between regions of different pigment is not well defined. As shown, a darker pigment (black) 110 has spread into a lighter pigment (yellow) 120 along the boundary 130 between the two different pigments. The printing fluid bleeding defect may be more pronounced between regions of block color. It can be seen that there is a printing fluid bleeding defect 140 along the boundary between comparatively dark (black), medium (red) and light (white) pigments.

FIG. 1B shows a coalescence for the same pre-treatment amount of 15% of the rendering fluid density per pixel on the cellulosic board as FIG. 1A. The rendering fluid may comprise a blue pigment which is deposited in a block color. As shown, there is a mild mottled appearance.

FIG. 2A shows an example of printing fluid bleeding for a pre-treatment amount of 30% of the rendering fluid density per pixel on a cellulosic board. Compared to the printing fluid bleeding defect of FIG. 1A in which 15% pre-treatment quantity was used, there is shown a reduction in printing fluid bleeding and hence an improvement in the appearance of the image quality. An increase in the pre-treatment quantity appears to reduce printing fluid bleeding for the rendering fluid shown and hence improves the image quality.

FIG. 2B shows a coalescence for the same pre-treatment amount of 30% of the rendering fluid density per pixel on the cellulosic board as FIG. 2A. The rendered image shows a stronger mottled appearance compared to FIG. 1B. The increase in pre-treatment quantity appears to increase the level of coalescence for the rendering fluid shown and hence reduces the image quality.

An adequate amount of pre-treatment (before firing the pigment or rendering fluid) can be varied to meet a desired or acceptable level of image quality attributes. According to an example for a cellulosic print target, the amount of pre-treatment to control the printing fluid bleeding defect may be 30% of the rendering fluid pigment or color printing fluid amount. However, this 30% pre-treatment may not be an adequate amount for coalescence for that same rendering fluid pigment, for example blue or green area fills, because the coalescence on those areas may worsen when the pre-treatment amount is increased or higher than 15%.

According to an example increasing pre-treatment quantity reduces printing fluid bleed, however too much pre-treatment may damage or increase coalescence. The pre-treatment amount per rendering fluid pigment (or printing fluid color) and/or per rendering fluid density (or printing fluid density) may be determined to find the right balance among the desired image quality attributes upon which the pre-treatment amount has an impact.

According to an example, optimisation of the amount of rendering fluid used to render an image can be obtained based on firing less pre-treatment fluid in some areas of the image. According to an example, the higher the pre-treatment level, the lower the rendering fluid used and/or gamut and/or the gloss, where a gamut is described as the range of pigments or colors in the image.

Figure 3A:
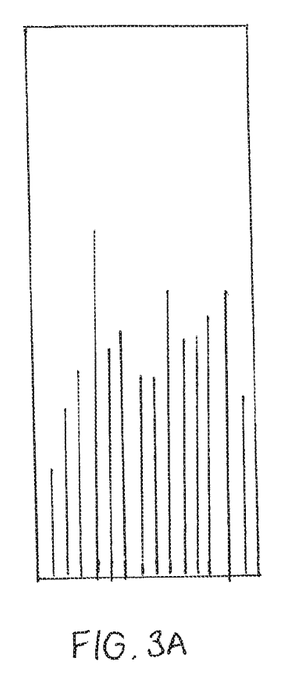
FIG. 3A is a schematic of a rendered image showing gloss banding according to an example.
Figure 3B:
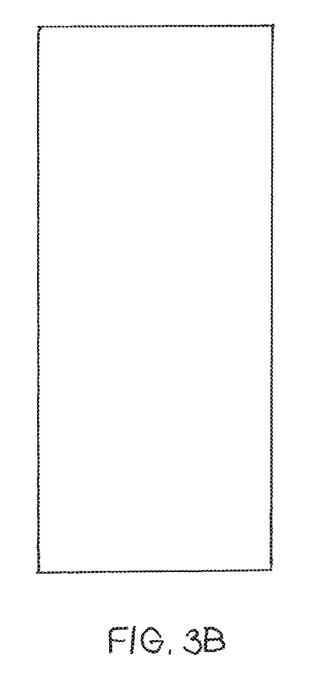
FIG. 3B is a schematic of a rendered image showing a reduction in gloss banding for a pre-treatment amount according to an example.

Varying the pre-treatment quantity has an effect on the level of gloss banding seen in a rendered image. FIG. 3A shows a rendered image having gloss banding according to an example. FIG. 3B shows a rendered image having a reduction in gloss banding according to an example. A different pre-treatment amount is used to produce the image of FIG. 3A compared to the pre-treatment amount that is used to produce the image of FIG. 3B. As such, by varying the level of pre-treatment applied when rendering an image can have a positive impact and improve or reduce gloss banding in the rendered image.

According to an example, reducing the pre-treatment quantity may improve gloss banding, however it worsens bleed and therefore when the pre-treatment amount is determined it can satisfy desired image quality defects so as to improve more than one image quality characteristic. For example, it may be considered that an image quality attribute is satisfied if there is a reduction or improvement in the severity of printing fluid bleed or coalescence or banding. According to an example, the pre-treatment amount is reduced on high printing fluid density areas whilst keeping or increasing the pre-treatment amount on medium and low printing fluid density areas.

Figure 4:
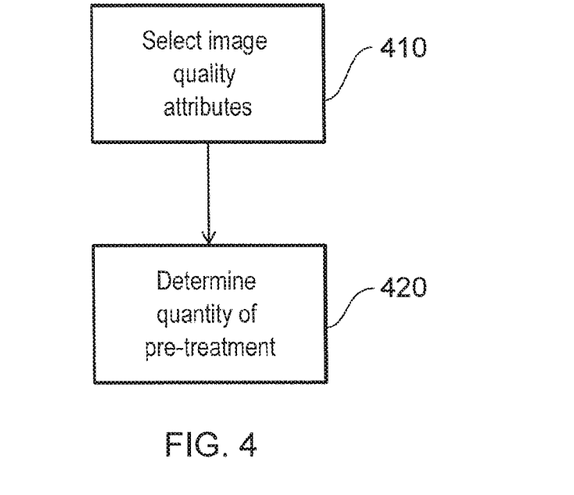
FIG. 4 is a method for rendering an image according to an example.

FIG. 4 shows a method for rendering an image according to an example. According to an example there is provided a method for rendering an image. The method may comprise selecting two or more image quality attributes for the image 410. For example, the image quality attributes may relate to a level of printing fluid bleeding, coalescence and/or gloss banding. Varying a pre-treatment amount for one attribute may improve the attribute, however at the same time in detriment to another attribute. Therefore, a balance to meet a desired level or visual appearance of more than one attribute is found based on a determination of an adequate amount of pre-treatment for the more than one attributes. For the image quality attributes selected, a quantity of pre-treatment for deposition onto a print target may be determined 420. The quantity of pre-treatment to meet or satisfy the image quality attributes selected may comprise reference to one or more look-up-tables. A look-up-table may be provided which may comprise various levels or degrees of an attribute for an image resource or image content. For example, the attribute may relate to a level of an printing fluid bleeding defect, coalescence or gloss banding for the image. For example, the image resource or image content may relate to a type of rendering fluid, a print target, a rendering fluid pigment, a rendering fluid density and/or a number of drops of rendering fluid per pigment. The pre-treatment quantity may be determined according to a pigment of a rendering fluid and a density of the rendering fluid in order to meet or satisfy the desired level or quality in the rendered image for the selected image quality attributes.

The quantity of pre-treatment may be determined as a proportion of the pigment and/or density of the rendering fluid. The density of the rendering fluid can be defined as a number of drops of the rendering fluid per pixel of the image. The pre-treatment may be applied to the print target and the rendering fluid may be subsequently deposited on the print target. Examples of an image quality attribute may comprise a bleed defect, coalescence, and/or gloss banding among other attributes.

The determination of the pre-treatment quantity to apply according to pigment and/or rendering fluid density can vary across an image so as to combine different pre-treatment amounts across the image. The different pre-treatment amounts may depend upon the image content to ensure an adequate image quality and adequate printing fluid efficiency. The pre-treatment quantity may be further determined according to a print target type, such as cellulosic material. According to an example a plurality of image quality attributes can be selected and the pre-treatment quantity determined to satisfy the selected image quality attributes, for example minimal gloss banding and coalescence. A different pre-treatment quantity may be determined for deposition on the print target per image quality attribute.

According to an example, the step of determining the pre-treatment quantity comprises use of a look-up-table (LUT). The pre-treatment amount can be applied according to a set of color resources in the LUT. The color resources can be used to transform colorants of an input image (such as CMYK) to colorants at the output or colorants that a rendering apparatus or printer comprises (such as Cyan, Magenta, Yellow, black, Light cyan, Light magenta, Pre-Treatment, OverCoat). According to an example, the LUT is generated using python software tools.

A LUT can be generated based on creating linearization's of an optical density of an image. In an example, an image quality attribute in a rendered image may be measured as an optical density per pixel of the image, for example to assess printing fluid bleed or coalescence throughout the rendered image. The optical density of the rendered image may not be proportional to the number of printing fluid drops. A conversion can be applied to make the optical density linear with the number of printing fluid drops. For example, an optical density of the image can be linearized to obtain an optical density that is proportional to a number of drops for a particular pigment and/or density of a rendering fluid. A number of samples of rendered images printed under varying conditions, such as pigment used, number of drops, etc., can be used to assess image quality using different amounts of pre-treatment. The resulting collection of optical density data for the rendered images can provide the data for the LUTs.

A LUT can be generated based on creating light-dark separations. This separation relates to how each rendering fluid available at a rendering apparatus is combined to create a particular color on the rendered image. For example, light cyan and light magenta can be combined with cyan and magenta respectively to meet an adequate image quality-printing fluid efficiency balance. The light-dark pigment separation can be performed to satisfy a selected image quality attribute.

A LUT can be generated based on creating colormaps. This relates to input colorants (CMYK) being transformed into output colorants (CMYKLcLmPtOc, where Pt is the pre-treatment amount and Oc is an overcoat). The pre-treatment quantity can be applied to input image data to create a gamut mapping for rendering output image data. The pre-treatment amount can be determined during this step using three tables.

A rendering fluid generation table can be provided defining a condition for generating a pre-treatment (Pt) plane defined as (COND_0). For example, the condition may be an image quality attribute that is desired such as a user choosing to minimise gloss banding in the rendered image. The condition may relate to a type of print target upon which the image is rendered at the printing apparatus.

TABLE 4

------Printing fluid generation------

| | | | | |
|---|---|---|---|---|
| NUMBER_OF_FIELDS | 5 | | | |
| NUMBER_OF_SETS | 2 | | | |
| BEGIN_DATA_FORMAT | | | | |
| SAMPLE_ID GEN_NAME COLORANTS CONDITIONS INKLIMITED | | | | |
| END_DATA_FORMAT | | | | |
| BEGIN_DATA | | | | |
| 0 | pretreatment_p | P | COND_0 | 0 |
| 1 | overcoat | S | COND_1 | 0 |
| END_DATA | | | | |
| # | | | | |

Rendering fluid conditions can be provided where a user can define which function to apply under each of the conditions. For example, the user may select a cellulosic board as the print target type and/or has a preference to minimise or reduce coalescence in the rendered image. The LUTs or colormaps provide a transformation that allows the amount of pre-treatment to be determined for the user's selected image quality attributes and/or print target type. For example, if COND_0 is TRUE then a function F1 may be applied, where the units of F1 may be represented by DROPS relating to the number of drops to be deposited on the print target.

TABLE 3

--------Printing fluid conditions-----

| | | | | |
|---|---|---|---|---|
| NUMBER_OF_FIELDS | 5 | | | |
| NUMBER_OF_SETS | 2 | | | |
| BEGIN_DATA_FORMAT | | | | |
| SAMPLE_ID COND_NAME UNITS CONDITION VALUE | | | | |
| END_DATA_FORMAT | | | | |
| BEGIN_DATA | | | | |
| 0 | COND_0 | DROPS | True | F1 |
| 1 | COND_1 | DROPS | True | F2 |
| END_DATA | | | | |
| # | | | | |

Rendering fluid functions may be defined as a fixed part (FIXED_INK) and/or a proportion or percentage part (PERCENTAGE_FUNCTION) for each pixel or location of the print target onto which rendering fluid and/or pre-treatment is deposited.

TABLE 2

-------Printing fluid functions------

| | | | | |
|---|---|---|---|---|
| NUMBER_OF_FIELDS | 6 | | | |
| NUMBER_OF_SETS | 2 | | | |
| BEGIN_DATA_FORMAT | | | | |
| SAMPLE_ID FNAME COLORANTS UNITS FIXED_INK PERCENTAGE_FUNCTION | | | | |
| END_DATA_FORMAT | | | | |
| BEGIN_DATA | | | | |
| 0 | F1 (0, 3, 15, 15) | CMYKcm | DROPS | (0, 3, 0, 0) |
| 1 | F2 (0, 3, 0, 0) | CMYKcm | DROPS | (0, 3, 0.5, 0.5) |
| END_DATA | | | | |
| # | | | | |

An example of a fixed part may be defined as (x1, x2, y1, y2), where the FIXED_INK function may comprise:
  i. when there are zero (x1) drops of colorants (CMYKcm), then deposit zero (y1) drops of pre-treatment (Pt).
  ii. when there are three (x2) drops of colorants (CMYKcm), then deposit zero (y2) drops of pre-treatment (Pt).
  iii. and for points in the middle of the interval (x1, x2) an interpolation can be applied to determine the number of drops of pre-treatment (Pt).

An example of a proportion part may be defined as (x1, x2, y1, y2), where the PERCENTAGE_FUNCTION function may comprise:
  i. when there are zero (x1) drops of colorants (CMYKcm), then deposit the pre-treatment (Pt) as 15% (y1) of the colorants quantity or number of drops.
  ii. when there are three (x2) drops of colorants (CMYKcm), then deposit the pre-treatment (Pt) as 15% (y2) of the colorants quantity or number of drops.
  iii. and for points in the middle of the interval (x1, x2) an interpolation can be applied.

As such, the colormaps provide a tool through which the pre-treatment amount can be determined according to desired image quality attributes and/or print target type.

According to an example, in a kapaline print target (or cellulosic foamboard) there may be some coalescence issues for green and blue areas of a rendered image. The pre-treatment amount can be determined as a maximum of 15% in the green and blue zones. However, a quantity of pre-treatment at 15% may result in printing fluid bleeding in high printing fluid density areas. A balance between coalescence and printing fluid bleeding is therefore determined using the colormaps or LUTs. For example, the pre-treatment may be set at 30% in printing fluid density areas having more than three drops and set at 15% elsewhere in the image. This may be implemented using colormaps as will now be described, similarly to that described above.

A rendering fluid generation table can be provided. There is a function defined by intervals to determine the pre-treatment (Pt) amount to be used for rendering an image. There may be two conditions that are provided (COND_0 and COND_1). For example, if COND_0 is TRUE then COND_0 may be evaluated before COND_1. If the condition COND_0 is NOT TRUE, then the COND_1 can be evaluated.

TABLE 4

-------Printing fluid generation-------

| | | | | |
|---|---|---|---|---|
| NUMBER_OF_FIELDS | 5 | | | |
| NUMBER_OF_SETS | 2 | | | |
| BEGIN_DATA_FORMAT | | | | |
| SAMPLE_ID GEN_NAME COLORANTS CONDITIONS INKLIMITED | | | | |
| END_DATA_FORMAT | | | | |
| BEGIN_DATA | | | | |
| 0 | pretreatment_p | P | COND_0; COND_1 | 0 |
| 1 | overcoat | S | COND_2 | 0 |
| END_DATA | | | | |
| # | | | | |

The COND_0 may comprise a condition such as: if there are more than three drops of C+M+Y+K+c+m, then select the pre-treatment function Pt=F1. If the condition COND_1 is TRUE, then select the pre-treatment function Pt=F2.

TABLE 3

-----Printing fluid conditions-------

| | | | | |
|---|---|---|---|---|
| NUMBER_OF_FIELDS | 5 | | | |
| NUMBER_OF_SETS | 4 | | | |
| BEGIN_DATA_FORMAT | | | | |
| SAMPLE_ID COND_NAME UNITS CONDITION VALUE | | | | |
| END_DATA_FORMAT | | | | |
| BEGIN_DATA | | | | |
| 0 | COND_0 | DROPS | (CMYKcm, >, 3) | F1 |
| 1 | COND_1 | DROPS | True | F2 |
| 2 | COND_2 | DROPS | True | F3 |
| 3 | COND_3 | DROPS | True | F4 |
| END_DATA | | | | |
| # | | | | |

According to an example, F1 can be defined as a proportion (i.e. not a fixed part) such as Pt (y1, y2)=30%. For example, F2 may be defined as a proportion such as Pt (y1, y2)=15%.

TABLE 2

--------Printing fluid functions------

| | | | | | |
|---|---|---|---|---|---|
| NUMBER_OF_FIELDS | 6 | | | | |
| NUMBER_OF_SETS | 3 | | | | |
| BEGIN_DATA_FORMAT | | | | | |
| SAMPLE_ID FNAME COLORANTS UNITS FIXED_INK PERCENTAGE_FUNCTION | | | | | |
| END_DATA_FORMAT | | | | | |
| BEGIN_DATA | | | | | |
| 0 | F1 | CMYKcm | DROPS | (0, 3, 0, 0) | |
| | (0, 3, 30, 30) | | | | |
| 1 | F2 | CMYKcm | DROPS | (0, 3, 0, 0) | |
| | (0, 3, 15, 15) | | | | |
| END_DATA | | | | | |
| # | | | | | |

The performance of the above-mentioned attributes or parameters, have thus far been described as influenced by or dependent upon pre-treatment quantity. According to an example, the image quality attribute may be varied via printing settings. The printing settings may be varied to improve or meet certain attribute characteristics, such as an printing fluid bleeding level or appearance of coalescence. In an example, the level of appearance of an image quality attribute in a rendered image may be measured as an optical density per pixel of the image. Similarly, as described above in relation to the variation of the pre-treatment amount, the variation of the printing settings may be modified to meet a desired level of one or more attributes where a balance between characteristic level of more than one attribute is determined. An example of a printing setting that may be varied may be a drying temperature or airflow across the rendered image. According to an example, a balance may be determined to decrease the drying temperature and drying airflow in a cellulosic print target to help coalescence whilst at the same time minimising the printing fluid bleeding defect. According to an example, a balance may be determined to increase a drying temperature to reduce (vertical) gloss banding whilst at the same time not impacting the printhead's reliability (crusting).

The present disclosure allows flexibility to finding a balance among the desired image quality attributes where different pre-treatment amounts are combined depending on the image content. This approach helps achieving an adequate image quality and/or adequate rendering fluid efficiency. The methods described improve the firing frequency and lifespan of a printhead. The method provides for a reduction in the cost per copy of the image whilst improving a visual appearance of the image. For example, the methods described visually improve printing fluid bleed, coalescence and/or gloss banding.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 5:
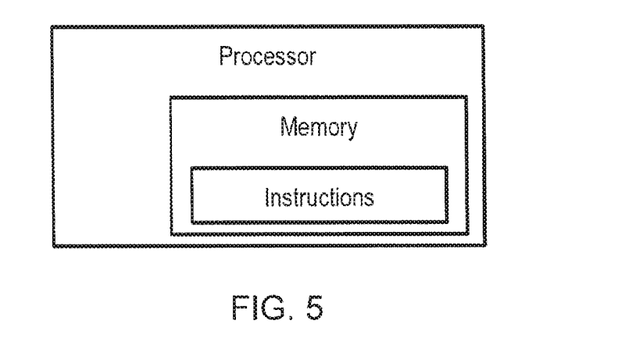
FIG. 5 is a schematic of a non-transitory machine-readable storage medium comprising instructions for image processing according to an example.

FIG. 5 shows a schematic representation of a non-transitory machine-readable storage medium comprising instructions for carrying out a protocol according to an example.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfill the functions of several units recited in the claims.

The features of any dependent claim may be combined with the features of any of the independent claims or other dependent claims.

The invention claimed is:

1. Method for rendering an image comprising:
   selecting quality attributes from a plurality of attributes of the image, wherein the quality attributes include at least bleed defect, coalescence, and gloss banding;
   determining for an area of the image a set of pigments for the area and a density for each pixel of the area and a print target type; and
   determining a quantity of pre-treatment for deposition onto a print target for the area, the pre-treatment quantity being dependent on the pigments, the density, the print target type, and the selected quality attributes.

2. A method according to claim 1, wherein the characteristic of the quality attributes is a level of visual appearance of the quality attributes.

3. A method according to claim 1, further comprising determining the quantity of pre-treatment as a proportion of the pigment and/or density of the rendering fluid.

4. A method according to claim 1, further comprising applying the pre-treatment to the print target and subsequently depositing the rendering fluid on the print target.

5. A method according to claim 1, wherein the density is defined as a number of drops of a rendering fluid per pixel of the image.

6. A method according to claim 1, wherein the pigment and/or density varies across the image.

7. A method according to claim 1, wherein a different pre-treatment quantity is determined for deposition on the print target per quality attribute.

8. A method according to claim 1, wherein the step of determining the pre-treatment quantity comprises use of a look-up-table (LUT).

9. A method according to claim 1, further comprising linearizing an optical density of the image in order to obtain an optical density that is proportional to a number of drops for the pigment and/or density.

10. A method according to claim 1, further comprising performing a light-dark pigment separation to meet the selected quality attribute.

11. A method according to claim 1, further comprising applying the pre-treatment quantity to input image data to create a gamut mapping for rendering output image data.

12. Apparatus for rendering an image, the apparatus comprising a processor having instructions to:
   select image quality attributes from a plurality of attributes of the image, wherein the selected quality attributes include at least bleed defect, coalescence, and gloss banding;
   determine for an area of the image a set of pigments for the area and a density for each pixel of the area, and a target type for the area; and
   determine a quantity of pre-treatment for deposition onto a print target for the area, the pre-treatment quantity being dependent on the pigments, the density, the target type, and the selected quality attributes.

13. A non-transitory machine-readable storage medium encoded with instructions executable by a processor, the machine-readable storage medium comprising instructions to:
   select quality attributes from a plurality of attributes of the image, wherein the selected quality attributes include at least bleed defect, coalescence, and gloss banding;
   determine for an area of the image a set of pigments for the area and a density for each pixel of the area, and a target type for the area; and
   determine a quantity of pre-treatment for deposition onto a print target for the area, the pre-treatment quantity being dependent on the pigments, the density, the target type, and the selected quality attributes.

* * * * *